Jan. 14, 1964 J. C. ABBEY ETAL 3,117,592
SELF-SEALING COUPLING
Filed July 31, 1957
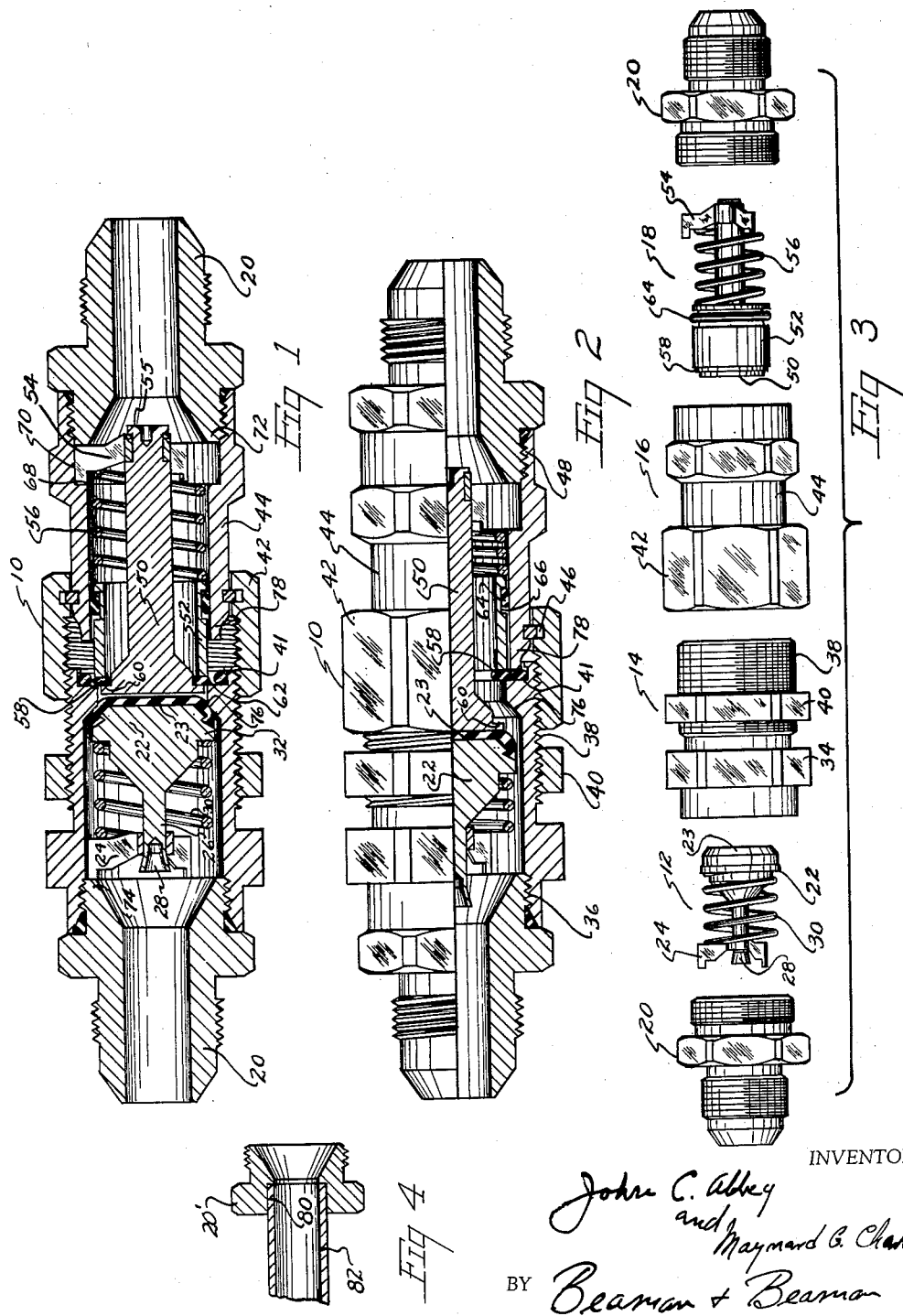
INVENTOR
John C. Abbey
and
Maynard G. Charles
BY Beaman & Beaman
ATTORNEY

United States Patent Office 3,117,592
Patented Jan. 14, 1964

3,117,592
SELF-SEALING COUPLING
John C. Abbey, Parma, and Maynard G. Charles, Napoleon, Mich., assignors to Aeroquip Corporation, Jackson, Mich., a corporation of Michigan
Filed July 31, 1957, Ser. No. 675,468
1 Claim. (Cl. 137—614.03)

The present invention relates to improvements in self sealing coupling of the type disclosed in United States Patent No. 2,208,286 being particularly concerned with structural and assembly improvements which, inter alia, have materially reduced the cost of production of such coupling and thus permits of their wider commercial use.

Improvements in the cost of manufacture of couplings of the aforesaid type which have been embodied in the present invention are numerous and include (a) the use of simple screw machine parts, stampings and cold headed parts so designed and manufactured as to eliminate secondary operations wherever possible, (b) the use of cartridge type valve mechanism making body components and valves relatively independent of each other to thus obviate maintaining the costly linear and concentric tolerances required in a rigid assembly, (c) simplified gasket seals which are inexpensive and serviceable, and (d) the cartridge concept of component parts which simplifies assembly and lends itself to automation by avoiding torque and critical location of components.

In addition to the advantages residing in the reduction in cost of manufacture, the present invention provides advantages and improvements in function, installation and servicing. These include (a) a resulting construction having unusually free flow pattern which permits the use of smaller size couplings, (b) longer seal life due to postponement of assembly of the valve cartridge in the coupling until installation as the seals are not required to function in storage and the tendency for the elastomeric compounds to take a "set" during the prolonged storage under compression is avoided, (c) component parts of the couplings are assembled by the user at the time of installation thus reducing manufacturing cost and allows for the complete lubrication of the coupling parts at the time the same are placed in service, and (d) the cartridge assemblies are interchangeable to avoid the use of matching parts, fitted valve seats and the like and so designed as to prevent faulty assembly as the parts may be assembled only in their correct combination.

The foregoing objects and advantages, as well as others, residing in the detailed construction, arrangement and combination of parts will more fully appear from the following specification and the appended claim.

In the drawings,

FIG. 1 is a cross-sectional view taken of the coupling with the valves shown in their closed position and the coupling bodies partially connected, FIG. 2 is a view similar to FIG. 1 with the valves shown open and the coupling bodies fully connected, FIG. 3 is an exploded view of the component parts of the coupling assembled, and FIG. 4 is a cross-sectional view of a modified form of adaptor.

Referring to the drawings the coupling 10 comprises four basic assemblies generally designated 12, 14, 16 and 18 plus suitable adaptor 20. The adaptor 20 may take numerous forms depending upon the type of fluid connection employed between the coupling and the conduit structure in which the coupling is installed.

Assembly 12 comprises a poppet valve 22 having a face 23 of elastomer such a neoprene, suitably bonded, molded or otherwise secured in place as shown. A three-legged retainer 24 is shown located on the stem 26 by expanding the outer end of the stem 26 at 28. A spring 30 compressed between the retainer 24 and flange 32 of the valve 22 holds the assembly in the extended position shown in FIG. 3.

Assembly 14 comprises the body 34 internally threaded at 36 and externally threaded at 38, with a jam nut 40 shown carried upon the threads 38. A sealing ring 41 is carried on an internal groove at the outer end of the body 34.

Assembly 16 comprises a coupling nut 42 which may be carried on the body 44 by a suitable groove and snap ring arrangement as shown at 46; the body 44 being internally threaded at 48.

Assembly 18 comprises a stem valve 50, a sleeve insert 52, a three-legged retainer 54 and a spring 56. Sleeve 52 has an elastomer face 58 such as neoprene and bonded in position to engage with flange 60 of the valve 50 as well as with the internal annular seat 62 of the body 34. A sealing O ring 64 is carried in a groove 66 defined in the sleeve 52. Retainer 54 is shown riveted on the outer end of the valve 50 by upsetting the reduced portion 55.

To assist the assembly of the parts of FIG. 3 in the right combination, only the bore 68 of the body 44 will receive the assembly 18, the retainer 54 being piloted in the counter bore 70 and located by the inner end 72 of the adaptor 20. Assembly 12 is inserted into the body 34 and the adaptor 20 is screwed into the position shown in FIG. 1 to back up the retainer 24 with the inner end 74 compressing the spring 30 and urging the poppet valve 22 against its seat 76.

As shown in FIG. 1, the coupling nut 42 is engaged with the last few threads 38 of the body 34. Thus, the valves 22 and 50 are in the position they assume just before the coupling is disconnected or just before effective connection takes place with the opposed faces thereof out of contact.

If the nut 42 is rotated in a coupling direction, the flat opposed complementary faces of the valves 22 and 50 will engage to displace the air between them. As rotation of the nut 42 continues the advancement of the stem valve 50 will displace the valve 22 from its seat 76 compressing the spring 30 and sliding the stem 26 within the bore of the retainer 24. At the same time the flange 60 of the valve 50 has been displaced from the bonded elastomer face 58 by the advancement of the body 44, with the abutment of the face 58 against the seat 62 arresting the movement of the insert 52 and compressing the spring 56. When the coupling is completely connected, the parts will assume the position of FIG. 2 with the nose 78 of the body 44 seated against the sealing ring 41. The fluid passage through the coupling is obvious from FIG. 2.

In FIG. 4 one advantage of the invention is illustrated wherein the adaptor 20' is shown having a brazed joint 80 with the rigid tube 82. Such a joint may be made before the adaptor 20' is assembled, for example, to the body 34, thus avoiding all heating difficulties to seals, etc.

Having thus described our invention, what we desire to protect by Letters Patent is:

A self-sealing coupling including a pair of fluid conduit mounted connector adaptors and first and second axially alignable hollow interconnectable body parts detachably mounted upon said adaptors characterized by its ability to be assembled after the adaptors are affixed to the fluid conduits comprising, in combination, first and second self-contained valve assemblies inserted into said first and second body parts, respectively, through the inner ends thereof, means within each of said body parts engaged by the valve assembly therein thereby sealing the passage through the body part, said valve assemblies having inner and outer ends, abutment means formed on the outer end of each of said assemblies adjacent the outer end of the associated body part whereby said abutment means of both assemblies mutually engage upon connection of said body parts and relative axial movement of said body parts during the connection thereof effects operation of the valve assemblies, said fluid connector adaptors detachably engaging with the inner ends of said body parts having retaining shoulders engaging the inner ends of said valve assemblies to locate said assemblies in said body parts, said second body part being provided with an internal shoulder adjacent the associated adaptor retaining shoulder, said second valve assembly comprising a retainer having fluid passages therein fixedly secured between said internal shoulder and the retaining shoulder of the associated adaptor, a stem fixed to said retainer having a valve head with an annular flange, a sleeve located between said head and retainer embracing said stem, a compression spring interposed between said retainer and one end of said sleeve, the other end of said sleeve abutting said flange to form a seal, said sleeve projecting radially beyond said head to define a sealing and abutment surface.

References Cited in the file of this patent

UNITED STATES PATENTS

| | | |
|---|---|---|
| 2,208,286 | Burger | July 16, 1940 |
| 2,289,946 | Weatherhead | July 14, 1942 |
| 2,451,218 | Hengst | Oct. 12, 1948 |
| 2,637,572 | Bruce | May 5, 1953 |
| 2,678,834 | Courtot | May 18, 1954 |
| 2,705,159 | Pfau | Mar. 29, 1955 |
| 2,706,646 | Olson | Apr. 19, 1955 |
| 2,815,226 | Rowland et al. | Dec. 3, 1957 |
| 2,821,412 | Frye | Jan. 28, 1958 |
| 2,823,048 | Hansen | Feb. 11, 1958 |
| 2,854,259 | Clark | Sept. 30, 1958 |
| 2,896,977 | Hensen | July 28, 1959 |